M. H. LYONS.
CUTTER HEAD.
APPLICATION FILED APR. 28, 1909.

949,126.

Patented Feb. 15, 1910.

Witnesses:
Edward Maxwell
James M. Hoy

Inventor:
Michael H. Lyons,
by Geo. S. Maxwell
Attorney.

UNITED STATES PATENT OFFICE.

MICHAEL H. LYONS, OF BROCKTON, MASSACHUSETTS.

CUTTER-HEAD.

949,126.  Specification of Letters Patent.  Patented Feb. 15, 1910.

Application filed April 28, 1909. Serial No. 492,647.

*To all whom it may concern:*

Be it known that I, MICHAEL H. LYONS, a citizen of the United States, and resident of Brockton, in the county of Plymouth and State of Massachusetts, have invented an Improvement in Cutter-Heads, of which the following description, in connection with the accompanying drawings, is a specification, like numerals on the drawings representing like parts.

My present invention is a cutterhead for increasing the effectiveness and rapidity of work of such machines as last-turning lathes, or wherever it is desired to rough off the work rapidly just ahead of the finishing thereof. To this end, I have provided in one and the same cutterhead two kinds of cutters, one arranged axially for routing the work and the other arranged peripherally for finishing, the cutter being held therefore oblique to the work in order that both sets of blades may operate at the same time on the work. Preferably also the routing portion of the cutterhead is made removable, as this will get dull, broken, or out of order much quicker than the rest of the cutterhead.

Figure 1:
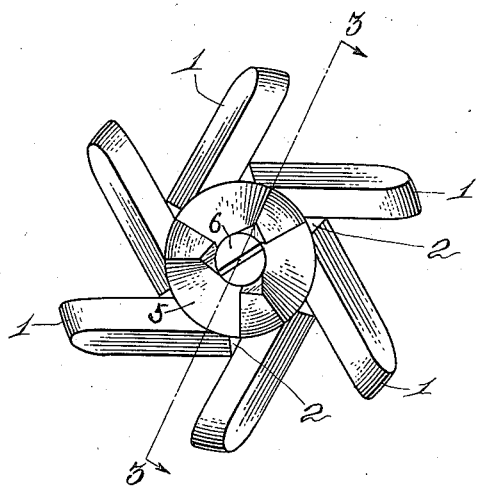
Figure 2:
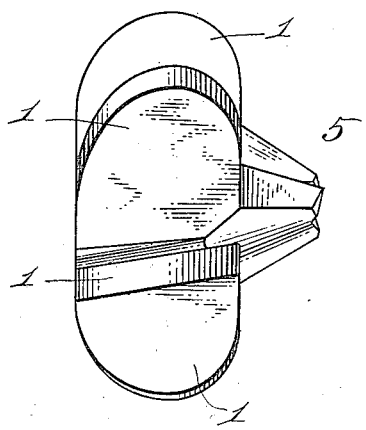
Figure 3:
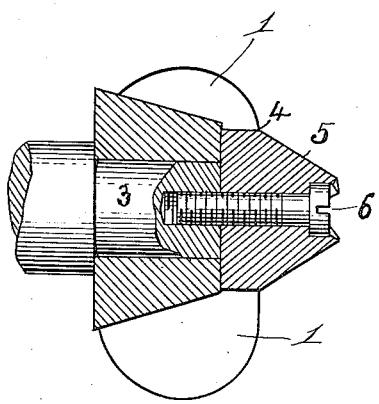
Figure 4:
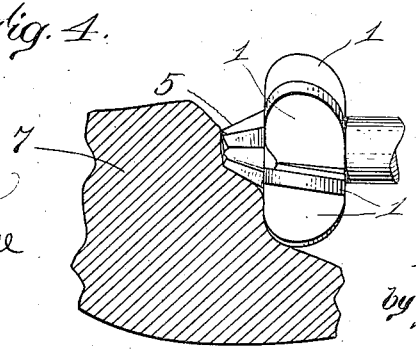

In the drawings, in which I have shown a preferred embodiment of my invention, Figure 1 is a view of the cutterhead in front end elevation; Fig. 2 a view thereof in side elevation; Fig. 3 a cross-sectional view on the line 3—3, Fig. 1; and Fig. 4 is a view partly in section and partly in side elevation illustrating the operation of the cutterhead on a piece of wood.

It will be understood that the general shape and arrangement of the cutterhead may be varied considerably, that herein shown being such as I employ for turning lasts in a last-lathe. To this end, I provide a series of tangentially set blades 1, herein shown as connected by radial necks to a central hub 3. The outline or cutting edges of these blades will conform to the particular work in hand, being herein shown as semi-circular for last work. At its front end the cutterhead is cut away or notched, see Fig. 3 to provide a recess 4 in which I mount a rosette-like routing cutter 5 secured immovably by any suitable means as by a screw 6. The action of my tool on the work is shown with reference to a block of wood 7, from which it will be seen that the routing cutter gouges out and roughs off the work rapidly ahead of the cutters 1 which follow and finish the work neatly in usual manner, thereby accomplishing quickly and neatly the desired results with one tool and at one operation. I have herein shown the cutterhead as made in two parts, the blades 1 being formed integrally with each other, but it will be understood that I am not limited in this respect, as the blades may be otherwise formed and may be set individually as is more customary in wood-working machinery.

Having described my invention, what I claim as new and desire to secure by Letters Patent is:

1. A cutterhead, comprising a series of laterally projecting, tangentially-set cutting blades, having approximately semi-circular cutting ends capable of doing relatively fine work, and a routing cutter capable of simultaneously doing rough work, projecting axially from the front end of said cutterhead.

2. A cutterhead, comprising a series of cutting blades extending laterally about their axis of rotation, an axial recess adjacent the meeting axial ends of said blades, and a roughing cutter removably mounted in said recess and projecting forward beyond said blades in position to rough off the work ahead of said blades.

In testimony whereof, I have signed my name to this specification, in the presence of two subscribing witnesses.

MICHAEL H. LYONS.

Witnesses:
  FERD S. SPRAGUE,
  FRED BRIDGWOOD.